UNITED STATES PATENT OFFICE.

OTTO WOLFES, OF DARMSTADT, GERMANY, ASSIGNOR TO LOUIS MERCK, EMMANUEL AUGUST MERCK, WILHELM MERCK, AND CARL EMMANUEL MERCK, COPARTNERS AS FIRM OF E. MERCK, OF DARMSTADT, GERMANY.

PROCESS OF MANUFACTURING DIALKYL BARBITURIC ACID.

No. 907,664.     Specification of Letters Patent.     Patented Dec. 22, 1908.

Original application filed September 22, 1905, Serial No. 279,689. Divided and this application filed April 6, 1907. Serial No. 366,675.

*To all whom it may concern:*

Be it known that I, OTTO WOLFES, doctor of philosophy, a subject of the Emperor of Germany, residing at the city of Darmstadt, in the Empire of Germany, have invented certain new and useful Improvements in the Processes of Manufacturing Barbituric Acids, of which the following is a specification.

The present application is a divisional application from my application Serial No. 279,689, filed September 22, 1905, and covers specifically the manufacture of barbituric acids, employing dialkyl malonylhaloids as starting material.

I have ascertained that if guanyl-urea is condensed with dialkyl malonylchlorid of the following general formula:

$$\text{Alkyl} \diagdown C \diagup \text{CO.Cl}$$
$$\text{Alkyl} \diagup \ \diagdown \text{CO.Cl}$$

condensation products are obtained which are probably mixtures of several substances for the reason that guanyl-urea is enabled to react in two pseudomeric forms:

*a*) $NH_2-CO-NH-C\diagup^{NH}_{\diagdown NH_2}$.

This unsymmetrical form can be condensed with the above-mentioned derivatives to substances of the two following typical formulas:

1. 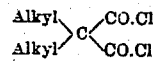

2. 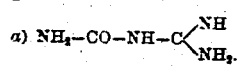

The second symmetrical form:

*b*) $NH_2-CO-N=C\diagup^{NH_2}_{\diagdown NH_2}$ is under the same circumstances condensed to substances of the following typical formula:

3. 

The substances of all these three typical formulas, when heated with aqueous acids, are easily converted into dialkyl barbituric acid of the well-known formula:

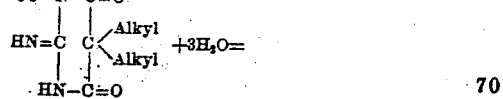

The following equations illustrate the chemistry of the transformation of the products 1, 2 and 3 into dialkyl-barbituric acid, by saponification:

1. 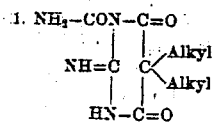

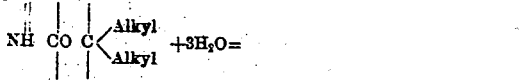

2. 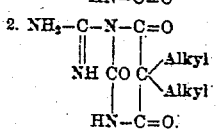

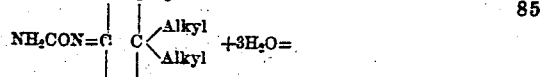

3. 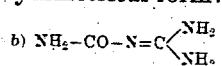

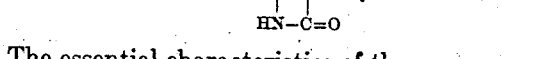

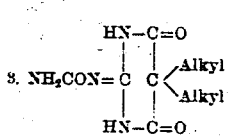

The essential characteristics of the process thus indicated will be seen from what is common to the following specific example.

*Free guanyl-urea and diethyl malonyl chlorid.*—10 grams of guanyl-urea which was prepared from the hydrochlorid by shaking it with silver oxid and evaporating the solution in a vacuum, were heated with 6 grams of diethyl malonyl chlorid to 100 degrees C. for 3 hours. The acid-chlorid which has remained unchanged was then removed by shaking out with ether, and the salts were removed by leaching in water. The residue was dissolved in cold diluted ammonia, and the ammonia, after the filtration of the liquid, was boiled away or neutralized by acetic acid. The derivative of pyrimidin crystallized in fine hard needles which decomposed above 300 degrees C. The substance is soluble in alkali, ammonia, and in mineral acids. By heating the product with saponifying means, e. g. sulfuric acid of 37%, diethyl barbituric acid was readily obtained.

Having now described my invention and in what manner the same is to be performed, what I claim and desire to secure by Letters Patent, is:

1. The process of manufacturing dialkyl barbituric acid, consisting in condensing guanyl-urea with dialkyl malonyl chlorid of the following general formula:

by heating the mixture of the said substances and saponifying the resulting condensation product by reacting this product with acids or in other suitable manner.

2. The process of manufacturing diethyl barbituric acid, consisting in condensing guanyl-urea with diethyl malonyl chlorid of the formula:

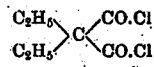

by heating the mixture of the said substances and saponifying the resulting condensation product by reacting this product with a mineral acid.

In testimony whereof I have hereunto set my hand in the presence of two subscribing witnesses.

OTTO WOLFES.

Witnesses:
WALTER SCHUMANN,
WALTER HAUSING.